United States Patent
Richards et al.

(10) Patent No.: US 11,579,039 B2
(45) Date of Patent: Feb. 14, 2023

(54) TORSIONAL TESTING OF A WIND TURBINE BLADE

(71) Applicant: Vestas Wind Systems A/S, Aarhus (DK)

(72) Inventors: William David Richards, Ventnor (GB); Pierre-Emmanuel Verrien, Cowes (GB); Michael Dann, Watford (GB)

(73) Assignee: Vestas Wind Systems A/S, Aarhus N (DK)

( * ) Notice: Subject to any disclaimer, the term of this patent is extended or adjusted under 35 U.S.C. 154(b) by 114 days.

(21) Appl. No.: 16/464,897

(22) PCT Filed: Nov. 29, 2017

(86) PCT No.: PCT/DK2017/050398
§ 371 (c)(1),
(2) Date: May 29, 2019

(87) PCT Pub. No.: WO2018/099531
PCT Pub. Date: Jun. 7, 2018

(65) Prior Publication Data
US 2020/0011760 A1 Jan. 9, 2020

(30) Foreign Application Priority Data
Nov. 30, 2016 (DK) .............................. PA 2016 70952

(51) Int. Cl.
*G01M 5/00* (2006.01)
*F03D 17/00* (2016.01)

(52) U.S. Cl.
CPC ........... *G01M 5/0016* (2013.01); *F03D 17/00* (2016.05); *G01M 5/0075* (2013.01); *F05B 2240/21* (2013.01); *F05B 2260/83* (2013.01)

(58) Field of Classification Search
CPC ... G01M 5/0016; G01M 5/0075; F03D 17/00; F05B 2240/21; F05B 2260/83
See application file for complete search history.

(56) References Cited

U.S. PATENT DOCUMENTS

| 2006/0037402 | A1* | 2/2006 | Musial | .................... G01M 7/00 |
| | | | | 73/664 |
| 2008/0201972 | A1 | 8/2008 | Landino et al. | |

(Continued)

FOREIGN PATENT DOCUMENTS

| CH | 702812 A2 | 9/2011 |
| CN | 101688824 A | 3/2010 |

(Continued)

OTHER PUBLICATIONS

Divinycell H Technical data, Diab group, Mar. 2009 (Year: 2009).*

(Continued)

*Primary Examiner* — Eman A Alkafawi
*Assistant Examiner* — Aeysha N Sultana
(74) *Attorney, Agent, or Firm* — Wood Herron & Evans LLP

(57) ABSTRACT

A test apparatus for torsional testing of a wind turbine blade is provided. The apparatus includes a test stand for rigidly supporting the wind turbine blade; a load frame for mounting on the wind turbine blade at a testing position along the length of the blade; and an actuator connected to the load frame for twisting the blade via the load frame. The load frame includes an outer frame to which the actuator is connected and a profiled insert held within the outer frame and defining a profiled aperture corresponding to the profile of the blade at the testing position. The profiled insert encloses and is in direct contact with the outer surface of the blade over substantially the entire profile of the blade. A system and method of torsional testing of a wind turbine (Continued)

blade and a load frame for the test apparatus are also provided.

20 Claims, 2 Drawing Sheets

(56) References Cited

U.S. PATENT DOCUMENTS

| | | | |
|---|---|---|---|
| 2011/0041617 A1* | 2/2011 | Cotrell | G01M 7/06 73/660 |
| 2012/0033207 A1 | 2/2012 | Faidi et al. | |
| 2013/0061683 A1* | 3/2013 | Baker | G01M 5/0058 73/834 |
| 2016/0018284 A1* | 1/2016 | Lee | G01M 5/0016 73/577 |
| 2017/0241860 A1* | 8/2017 | Richards | G01M 7/06 |

FOREIGN PATENT DOCUMENTS

| | | |
|---|---|---|
| CN | 102301129 A | 12/2011 |
| CN | 103398840 A | 11/2013 |
| CN | 203824721 U | 9/2014 |
| CN | 105422389 A | 3/2016 |
| CN | 105593661 A | 5/2016 |
| DE | 102012205153 A1 | 10/2013 |
| GB | 2488789 A | 9/2012 |
| TW | 201910593 A * | 3/2019 ............ E02D 27/52 |
| WO | 2009135136 A2 | 11/2009 |
| WO | 2016045684 A1 | 3/2016 |

OTHER PUBLICATIONS

China National Intellectual Property Administration, First Notification of Office Action in CN Application No. 201780082954.3, dated Apr. 17, 2020.

The University of Maine, Wind Blade Testing, Jan. 20, 2016 (retrieved on Mar. 29, 2017, https://composites.umain.edu/wp-content/uploads/sites/20/2016/07/UMCompositesCenter-WindBladeTesting_rev.3-1.pdf, Brochure.

Peter Berring et al., Torsional Performance of Wind Turbine Blades—Part I: Experimental Investigation, Wind Energy Department, Risø National Laboratory, Technical University of Denmark, Department of Mechanical Engineering, Apr. 30, 2007 [retrieved on Mar. 31, 2017], retrieved from http:/iccm-central.org/Proceedings/ICCM16proceedings/contents/pdf/FriA/FrAA2-01ge_berringp223538p.pdf.

Danish Patent and Trademark Office, Search and Examination Report in PA 2016 70952, dated Mar. 31, 2017.

European Patent Office, International Search Report and Written Opinion in PCT Application No. PCT/DK2017/050398, dated Aug. 2, 2018.

European Patent Office, Examination Report in EP Application No. 17868506.1, dated May 4, 2022.

* cited by examiner

TORSIONAL TESTING OF A WIND TURBINE BLADE

The present invention relates to a test apparatus for torsional testing of a wind turbine blade. In particular, the present invention relates to a test apparatus for torsional testing of a wind turbine blade comprising a test stand for rigidly supporting a root end of the wind turbine blade, a load frame for mounting to the wind turbine blade, and at least one actuator for twisting the wind turbine blade about its longitudinal axis via the load frame. The present invention also relates to a load frame for such a test apparatus and to systems and methods of torsional testing a wind turbine blade.

Wind turbine blades are subjected to torsional loading during use as a result of inertial loads and aerodynamic loads, such as lift and drag. This torsional loading is cyclical and may cause weakening of the blades over the duration of their service life, eventually leading to fatigue failure in the absence of an appropriate design. Additionally, the wind turbine blades are caused to twist about their longitudinal axes due to the torsional loading. This twisting changes the pitch of the blade relative to the wind direction and this can affect the efficiency with which wind energy is captured and converted by the wind turbine. The pitch of a wind turbine blade can typically be varied during use by a wind turbine controller to improve the efficiency of the wind turbine and the degree of pitch is based on an estimation of the torsional stiffness of the blade obtained by torsional testing.

Current torsional testing is typically carried out by modifying the test apparatus used for flapwise loading tests. Such test apparatuses typically include a test stand for rigidly supporting the root end of the blade, with the longitudinal and edgewise axes of the blade in a substantially horizontal orientation, and a short frame positioned against the blade surface on either side of the blade and extending along part of the width of the blade. The frame typically comprises a pressure side frame element and an opposing suction side frame element connected by a bolt extending through drill holes in the blade. For flapwise static loading tests, the frame is connected to one or more actuators which apply a vertical load to the wind turbine blade via the frame to deflect the blade in the flapwise direction. For flapwise fatigue tests, the actuator or actuators apply a cyclical vertical load to the wind turbine blade via the frame to oscillate the blade in the flapwise direction. For torsional testing, the frame is usually connected at an edge on its underside to a winch and at an opposed edge on its upper side to a crane. The crane and the winch alternately pull on the frame to twist the blade about its longitudinal axis. Data relating to the torsional performance of the blade is then obtained from strain gauges positioned on the surface of the blade.

However, as the test apparatus used for flapwise loading tests is not optimised for torsional testing and does not allow for fine control of blade deflection, the data obtained from conventional torsional tests may differ significantly from actual operating performance. This may lead to over-engineering of wind turbine blades in order to meet unrepresentative test requirements. It may also lead to inaccurate estimations of torsional stiffness, which can in turn lead to errors in the estimation of blade pitch during use. This may make it more difficult to ensure that a blade is in the optimal orientation during use. Furthermore, knowledge of torsional stiffness can facilitate design to avoid resonance of the blade, such as flutter, during operation. Both over-engineering and inaccurate pitch estimation can reduce the annual energy production of a given wind turbine.

It would therefore be desirable to provide a test apparatus and method for torsional testing of a wind turbine blade which is more representative of actual loading conditions.

SUMMARY OF THE INVENTION

According to a first aspect of the invention there is provided a test apparatus for torsional testing of a wind turbine blade, comprising: a test stand for rigidly supporting a root end of the wind turbine blade; a load frame for mounting on the wind turbine blade at a testing position along the length of the wind turbine blade; and at least one actuator connected between a fixed mounting point and the load frame for twisting the wind turbine blade about its longitudinal axis via the load frame, wherein the load frame comprises an outer frame to which the at least one actuator is connected and a profiled insert held within the outer frame, the profiled insert defining a profiled aperture substantially corresponding to the profile, or cross-section, of the wind turbine blade at the testing position such that, in use, the profiled insert substantially encloses and is in direct contact with the outer surface of substantially the entire profile of the wind turbine blade.

Advantageously, by arranging the insert such that it substantially encloses, or extends around, the wind turbine blade profile and is in direct contact with the outer surface of substantially the entire profile of the wind turbine blade, the torsional loading is more uniformly applied over the wind turbine blade profile than test apparatuses in which the load frame is in contact with the blade profile over only part of the blade chord. Thus, the stresses and strains in the blade during the test are more representative of actual loading.

The profiled insert substantially encloses the profile of the wind turbine blade. This means that the profiled insert extends around at least 80 percent of the full circumference of the blade profile, preferably at least 90 percent, more preferably at least 95 percent. The profiled insert may enclose, or extend around, the entire profile of the wind turbine blade.

The profiled aperture is shaped such that the profiled insert is in direct contact with the outer surface of the wind turbine blade over substantially the entire profile of the wind turbine blade. This means that the profiled insert is in direct contact with the outer surface of the wind turbine blade for at least 80 percent of the full circumference of the blade profile, preferably at least 90 percent, more preferably at least 95 percent. The profile aperture may correspond exactly to the profile of the wind turbine blade such that the profiled insert is in direct contact with the outer surface of the wind turbine blade over the entire profile of the wind turbine blade.

As used herein, the terms "edgewise direction" and "edgewise axis" refer to a direction extending through the leading and trailing edges of the blade and which is perpendicular to the longitudinal axis of the blade. This generally corresponds to the direction of rotation of the blade during use. The terms "flapwise direction" and "flapwise axis" refer to a direction which is perpendicular to both the edgewise direction and to the longitudinal axis of the blade.

The profiled insert is preferably soft. In other words, the profiled insert is preferably formed from a material or materials having a compressive strength of less than or equal to 10 MPa. The profiled insert may be resilient. The profiled insert may be formed from a material having a compressive strength of from about 0.3 MPa to about 10 MPa, preferably from about 1 MPa to about 7 MPa, most preferably from about 2 MPa to about 4 MPa.

Having a soft profiled insert results in a reduction in the occurrence of locally increased pressure points on the blade surface which may otherwise cause the test results to be less representative of the actual stresses and strains experienced by the blade during operation. It may also improve the degree to which the insert conforms to the contours of the blade profile, for example by accommodating differences between the shape of the insert and the blade profile due to manufacturing tolerances. The soft nature of the insert may also allow the load frame to absorb certain shock loads which may otherwise be transmitted directly to the blade surface and may cause damage.

The profiled aperture defined by the profiled insert has a shape which substantially corresponds to the profile, or cross-sectional shape, of the wind turbine blade being tested. The profiled insert may have a first end in which the leading edge of the wind turbine blade profile may be received and a second end in which the trailing edge of the wind turbine blade profile may be received. The first and second ends of the profiled aperture may both correspond directly to the contours of the leading edge and the trailing edge of the wind turbine blade being tested. In some embodiments, the profiled insert further comprises a stress reduction hole which intersects with an end of the profiled aperture corresponding to an edge of the wind turbine blade, such as the leading edge or the trailing edge. The stress reduction hole preferably has a radius of curvature which is greater than the radius of curvature of the edge of the wind turbine blade profile.

Advantageously, the stress reduction hole increases the radius of curvature at the end of the profiled aperture to reduce the stress concentration in this region of the insert. This may help to increase the useful life of the insert and may help to reduce crack propagation which may otherwise occur in the insert. The profiled insert may have a stress reduction hole intersecting with each of its ends.

The stress reduction hole preferably has a minimum radius of curvature of at least 2 cm. The stress reduction hole preferably has a radius of curvature of from about 2 cm to about 20 cm.

The stress reduction hole may be a cavity provided on one or both sides of the insert. In preferred embodiments, the stress reduction hole forms a channel extending through the thickness of the insert. This allows the stress concentration hole to double as a pathway through which instrumentation cables may run from one side of the load frame to the other. It may also result in more effective stress reduction than a cavity which does not extend through the thickness of the insert.

The at least one actuator may comprise any suitable actuator. For example, the at least one actuator may comprise a rotary actuator, such as a winch, connected to the load frame by a flexible cable. Preferably, the at least one actuator comprises a linear actuator, such as a hydraulic, pneumatic or electrical actuator. Linear actuators have a high load capability, allowing the test apparatus to be used on blades with very high levels of torsional stiffness. The at least one actuator may be arranged to exert a force on the load frame in any direction with a component transverse to the longitudinal axis of the blade. Preferably, the at least one actuator is arranged to exert a force on the load frame in a substantially vertical direction. With this arrangement, the at least one actuator can act against the weight of the blade and support the blade during the test. This may further improve the correlation between the results obtained during the test and actual operating conditions.

The at least one actuator may comprise a single actuator. Preferably, the at least one actuator comprises two or more actuators. In some embodiments, the at least one actuator comprises a pair of actuators arranged to apply a couple to the load frame, for example, a pair of actuators on either side of the central axis of the profiled aperture. In such an arrangement, the pair of actuators will be connected to the load frame on either side of the longitudinal axis of the blade being tested.

Where the at least one actuator comprises a pair of actuators arranged to apply a couple to the load frame, the pair of actuators may be arranged in any suitable manner. For example, the pair of actuators may be positioned adjacent to each other or on opposite sides of the load frame. In some examples, the pair of actuators comprises a first actuator on a lower side of the load frame and a second actuator on an upper side of the load frame. In this example, the actuators are both retracted or both extended to exert a couple on the load frame. In other examples, the pair of actuators may be positioned side by side. In such examples, a couple may be applied to the load frame by extending one of the actuators while retracting the other.

Preferably, the at least one actuator comprises a pair of linear actuators connected to the outer frame on either side of the central axis of the profiled aperture such that extension or retraction of each linear actuator exerts a substantially vertical force on the load frame.

The at least one actuator may be ground mounted. In preferred embodiments, the test apparatus further comprises a support frame to which the at least one actuator is mounted. The support frame may be moveable relative to the test stand in the direction of the length of the wind turbine blade. This allows the at least one actuator and the load frame to be more easily moved together to the testing position. The support frame may comprise any suitable movement means, for example, one or more wheels on its underside. Preferably, the support frame comprises one or more wheels on its underside and one or more feet. One or both of the wheels and the feet may be selectively retractable, for example using a threaded connection to the support frame, to expose the other. This allows the support frame to be moved easily when required or to be secured in position using the feet. Where the support frame comprises one or more feet, the one or more feet may comprise suction pads for securing or anchoring the support frame to a floor surface during use.

The load frame may be supported in the support frame entirely by the at least one actuator. Preferably, the support frame comprises a flexible linkage extending between the support frame and the load frame for bearing at least a portion of the weight of the load frame. The support frame may comprise a counterweight for bearing at least a portion of the weight of the load frame. For example, the counterweight may comprise one or more weights connected to the load frame by a cable, chain, strop, or rope running over one or more pulleys or eyelets to bear at least a portion of the weight of the load frame. The counterweight or linkage may be arranged to bear substantially all of the weight of the load frame.

By providing a linkage or counterweight which is arranged to bear at least a portion of the weight of the load frame, it is possible to reduce or prevent loading of the blade due to the weight of the load frame. This may improve the accuracy of the results obtained from a torsional test by reducing or minimising blade motion caused by edgewise loading. Thus, the measurements of blade motion obtained may be limited to motion caused by torsional loading only.

According to a second aspect of the present invention, there is provided a test apparatus for torsional testing of a wind turbine blade, comprising: a test stand for rigidly supporting a root end of the wind turbine blade; a load frame for mounting on the wind turbine blade at a testing position along the length of the wind turbine blade; and at least one actuator connected between a fixed mounting point and the load frame for twisting the wind turbine blade about its longitudinal axis via the load frame, wherein the test stand, load frame and at least one actuator are arranged such that, in use, the wind turbine blade to be tested is rigidly supported by the test stand with the longitudinal axis of the blade substantially horizontal and the edgewise axis of the blade substantially vertical.

By arranging the test apparatus such that, when in use, the blade is supported and tested with its longitudinal axis substantially horizontal and its edgewise axis substantially vertical, the blade is subjected to less deflection under its own weight in comparison to test apparatuses in which the blade is supported with its edgewise axis substantially horizontal. This means that the torsional stiffness of the blade can be assessed with the blade in a state of deflection which is more representative of its actual state during operation, resulting in more accurate test results. It can also reduce "over engineering" of the blade which may otherwise result from seeking to achieve the required performance during a less representative test.

The at least one actuator may comprise a single actuator. Preferably, the at least one actuator comprises two or more actuators. In some embodiments, the at least one actuator comprises a pair of actuators arranged to apply a couple to the load frame, for example, a pair of actuators on either side of the central axis of the profiled aperture. In such an arrangement, the pair of actuators will be connected to the load frame on either side of the longitudinal axis of the blade being tested.

According to a third aspect of the present invention, there is provided a system for torsional testing of a wind turbine blade, the system comprising a test apparatus according to any of the embodiments described above, and a wind turbine blade to be tested, wherein a root end of the wind turbine blade is supported by the test stand of the test apparatus such that the longitudinal axis of the blade is substantially horizontal and the edgewise axis of the blade is substantially vertical and wherein the load frame is mounted on the wind turbine blade at the testing position.

The load frame may be secured to the blade at any suitable testing position along the length of the blade. For example, the load frame may be secured close to the root end of the blade, or at or towards the tip of the blade, or any position in between. Where the load frame is mounted towards the root end of the blade, smaller displacements and larger forces are required. Where the load frame is mounted towards the tip end of the blade, larger displacements and smaller forces are required. The optimal position for the load frame may vary from blade to blade depending on the stiffness of the blade and its torsional behaviour and may also depend on the characteristics and performance of the actuator. The testing position may be selected by calculating an approximate mean position of the torsional loads applied to the blade during typical operation and mounting the load frame on the blade at that position.

According to a fourth aspect of the present invention, there is provided a load frame for the test apparatus of any of the embodiments described above, the load frame comprising: an outer frame having at least one actuator mounting point; and a profiled insert held within the outer frame, the profiled insert defining a profiled aperture substantially corresponding to the profile, or cross-sectional shape, of a wind turbine blade to be tested at a testing position along the length of the wind turbine blade such that, in use, the profiled insert substantially encloses and is in direct contact with the outer surface of substantially the entire profile of the wind turbine blade.

According to a fifth aspect of the present invention, there is provided a method of torsional testing a wind turbine blade, the method comprising: rigidly supporting a root end of the wind turbine blade in a test stand such that the longitudinal direction of the blade is substantially horizontal and the edgewise direction of the blade is substantially vertical; mounting a load frame on the wind turbine blade at a testing position along the length of the wind turbine blade; connecting at least one actuator between a fixed mounting point and the load frame; and twisting the wind turbine blade about its longitudinal axis at the testing position using the at least one actuator and the load frame.

The step of twisting the wind turbine blade about its longitudinal axis at the testing position while rigidly supporting the root end of the blade causes the blade to twist and may mimic twisting of the blade which may occur during operation. The step of twisting the wind turbine blade about its longitudinal axis is carried out by applying a static load to the load frame.

Preferably the load frame comprises an outer frame to which the at least one actuator is connected and a profiled insert held within the outer frame, the profiled insert defining a profiled aperture substantially corresponding to the profile, or cross-sectional shape, of the wind turbine blade at the testing position such that the profiled insert substantially encloses and is in direct contact with the outer surface of substantially the entire profile of the wind turbine blade.

The step of connecting at least one actuator to the load frame may be carried out by connecting a pair of linear actuators to the load frame on either side of the longitudinal axis of the blade and the step of twisting the wind turbine blade about its longitudinal axis carried out by applying a couple with the pair of linear actuators. The pair of actuators may be arranged in any suitable manner. For example, the pair of actuators may be positioned adjacent to each other or on opposite sides of the load frame. In some examples, the pair of actuators comprises a first actuator on a lower side of the load frame and a second actuator on an upper side of the load frame. In such an example, the actuators are both retracted or both extended to exert a couple on the load frame. In other examples, the pair of actuators may be positioned side by side. In such examples, a couple may be applied to the load frame by extending one of the actuators while retracting the other.

Preferably, the at least one actuator comprises a pair of linear actuators connected to the outer frame on either side of the longitudinal axis of the wind turbine blade such that extension or retraction of each linear actuator exerts a substantially vertical force on the load frame.

The at least one actuator may be ground mounted. In preferred embodiments, the step of connecting at least one actuator to the load frame comprises providing a support frame to which the at least one actuator is mounted and connecting the load frame to the support frame via the at least one actuator. The support frame may be moveable relative to the test stand in the direction of the length of the wind turbine blade. This allows the at least one actuator and the load frame to be more easily moved together to the testing position. The support frame may comprise any suitable movement means, for example, one or more wheels on its underside. Preferably, the support frame comprises one or more wheels on its underside and one or more feet. One or both of the wheels and the feet may be selectively retractable, for example using a threaded connection to the support frame, to expose the other. This allows the support frame to be moved easily when required or to be secured in position using the feet The load frame may be formed from two or more discrete frame elements which may be assembled together to form the complete load frame. In such examples, the step of mounting a load frame on the wind turbine blade may be carried out by assembling the discrete frame elements together around the wind turbine blade at the testing position. In other examples, the step of mounting a load frame on the wind turbine blade may be carried out by sliding the load frame in a direction along the length of the blade from a tip end of the blade to the testing position.

In some examples, the step of connecting at least one actuator to the load frame comprises providing a moveable support frame to which the at least one actuator is mounted and connecting the load frame to the support frame via the at least one actuator, and the step of mounting the load frame on the wind turbine blade is carried out by moving the support frame to slide the load frame in a direction along the length of the blade from a tip end of the blade to the testing position.

As used herein, the terms "ground-supported" and "ground mounted" refer to a component which is supported on a surface which is fixed in relation to the test stand of the apparatus, either directly, or indirectly via one or more intermediate elements. This includes, but is not limited to, components which are supported directly by the floor.

Features described in relation to one or more aspects may equally be applied to other aspects of the invention. In particular, features described in relation to the test apparatus of the first aspect may be equally applied to the test apparatus of the second aspect, the system of the third aspect, the load frame of the fourth aspect, the method of the fifth aspect, and vice versa.

BRIEF DESCRIPTION OF THE DRAWINGS

The invention will now be further described by way of example only and with reference to the accompanying figures in which.

DETAILED DESCRIPTION

Figure 1:
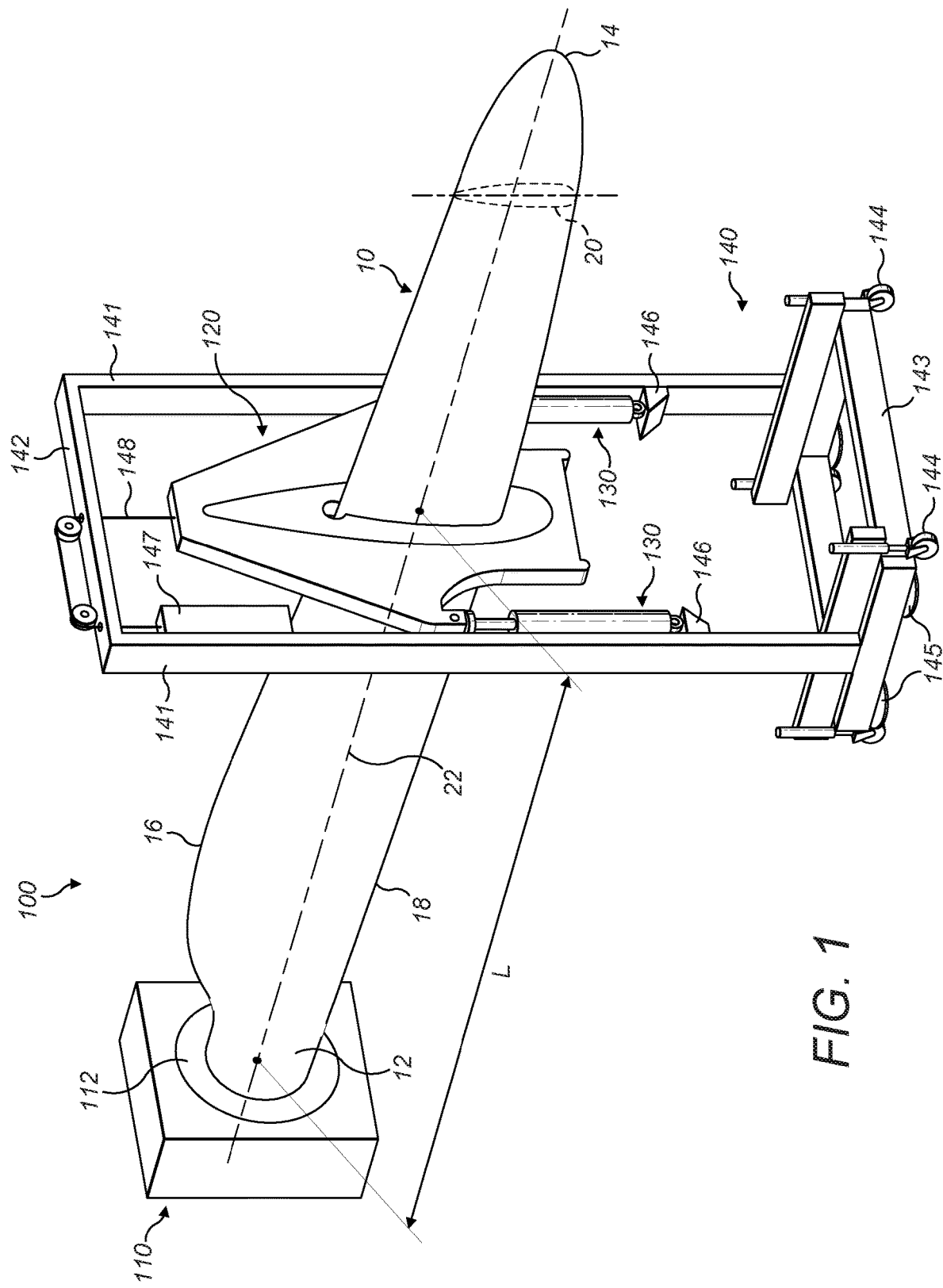
FIG. 1 is a schematic perspective view of a test apparatus according to the invention, showing the apparatus secured to a wind turbine blade.

FIG. 1 shows a test apparatus 100 for torsional static testing of a wind turbine blade 10 to which the apparatus 100 is secured. The wind turbine blade 10 has a root end 12 and an opposed tip end 14. Between the root end 12 and the tip end 14 is an airfoil region having a profiled contour that includes a pressure side and a suction side, as well as a leading edge 16 and a trailing edge 18. An edgewise direction 20 extends between the leading and trailing edges 16, 18. The edgewise direction 20 may change along the length of the blade 10 as the shape of the blade 10 twists between the root and tip ends 12, 14.

The test apparatus 100 comprises a test stand 110, a load frame 120, and actuators 130 operating on either side of the longitudinal axis of the blade 10 for applying a couple, and hence a torsional load, to the blade 10 via the load frame 120. The test apparatus 100 also includes a support frame 140 providing fixed mounting, fixed relative to the ground, for the actuators 130 and by which the load frame 120 may be supported when not secured to the blade.

The test stand 110 is mounted on a ground surface, such as the floor or a steel hub mounted to the floor, and includes a rigid mount 112 for fixedly supporting the root end 12 of the blade 10 such that the edgewise direction 20 of the blade is substantially vertical and the longitudinal direction 22 of the blade 10 is substantially horizontal, as shown in FIG. 1. The rigid mount 112 may comprise any suitable connection means for attachment to the blade 10. For example, the rigid mount may comprise a plurality of threaded bolts extending from the test stand 110 which are screwed into corresponding threaded bolt holes (not shown) at the root end 12 of the blade.

The load frame 120 is secured around the wind turbine blade 10 at a position between the root end 12 and tip end 14 of the blade 10 and at a distance L from the root end 12.

Figure 2:
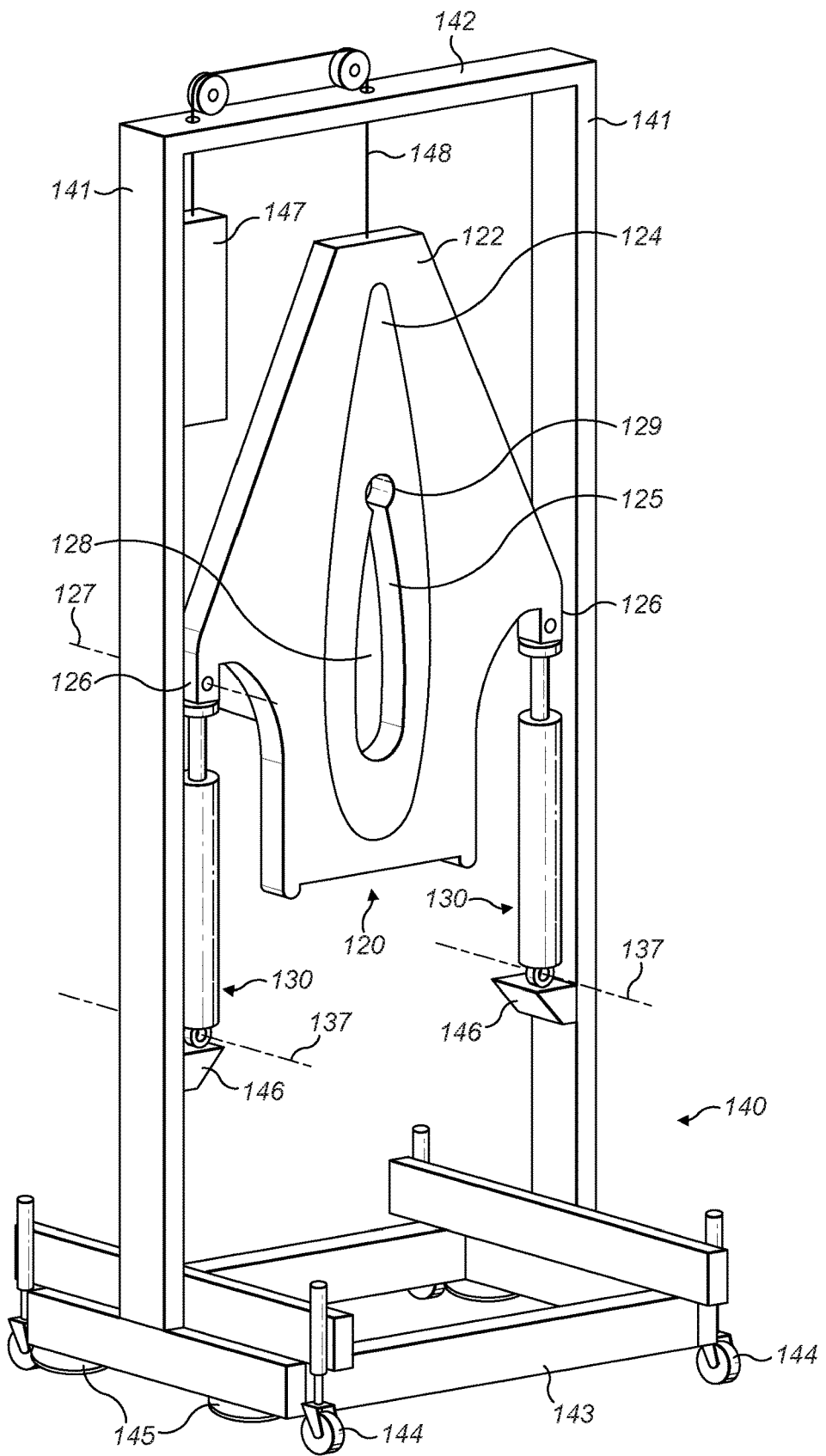
FIG. 2 is an enlarged view of the load frame, support frame and actuators of the test apparatus of FIG. 1.

Referring to FIG. 2, the load frame 120 comprises an outer frame 122 and an insert 124 arranged within the outer frame 122. The load frame 120 is pivotally connected to the actuators 130 on either side by mounting points 126 on the outer frame 122. In this example, the mounting points 126 are in the form of horizontally orientated pivot pins which allow the load frame 120 to be articulated relative to the actuators 130 about a horizontal axis 127 which is parallel to the longitudinal direction of the blade. In this example, the outer frame 122 is formed from two parallel sheets of metal, such as aluminium, which are secured together. In this manner, the outer frame 122 has a structure which is strong in the plane of the couple applied by the actuators 130 while still being relatively light. The sheets from which the outer frame 122 is made are cut out in the region adjacent to the mounting points 126 to further reduce the overall weight of the load frame 120 and the material required. For the same reasons, the outer frame narrows towards its upper end to remove the need for material outside of the load path from the actuators 130 to the blade.

The insert 124 is formed from a soft or slightly resilient material and its inner surface 125 defines a profiled aperture 128 corresponding to the profile or cross-section of the wind turbine blade at the position along the length of the blade at which the load frame 120 is to be mounted. That is, referring to FIGS. 1 and 2, the shape of the profiled aperture 128 corresponds to the profile or cross-section of the wind turbine blade at the distance L from the root end 12 of the blade 10. This means that the profile of the blade is entirely enclosed within the insert 124 such that the inner surface 125 of the insert 124 is in contact with the outer surface of wind turbine blade around substantially the entire profile of the blade. The insert 124 may be shaped such that one or both ends of the aperture 128 terminate at a narrow angle corresponding to an edge of the blade profile. However, in this example, a stress reduction portion is provided in the insert 124 in the form of a circular hole 129 which intersects with the profiled aperture 128 towards its upper end. As can be seen in FIG. 1, the upper end of the aperture 128 is arranged to receive the trailing edge of the blade, which is typically the thinnest portion of the blade profile. The circular hole 129 increases the radius of curvature at the upper end of the aperture 128 to reduce the stress concentration in this region. This may help to reduce crack propagation which may otherwise occur in the insert 124. The hole 129 also provides a channel in the insert 124 through which instrumentation cables may run from one side of the load frame to the other.

The insert 124 may be made from any suitable soft or resilient material that is capable of transmitting the torsional loads from the actuators 130 to the blade without damaging the outer surface of the blade. In this example, the insert is made from Divinycell® H130, available from Diab International AB of Helsingborg Sweden. As the insert 124 is soft or resilient, it forms a soft surface against the blade. This may improve the degree to which the load frame 120 conforms to the contours of the blade profile relative to conventional inserts, such as wood inserts. This allows the load frame to apply a more evenly distributed load across the surface of the blade. It also reduces the occurrence of locally increased pressure points which may otherwise cause the test results to be less representative of the actual stresses and strains experienced by the blade during operation. The softness or resilience of the insert 124 may also allow the load frame to absorb certain shock loads which may otherwise be transmitted directly to the blade surface.

The actuators 130 each comprise a linear actuator having a cylinder 132 and a piston 134 that is slidable within the cylinder 132. However, each actuator may comprise any suitable actuator, for example a rotary actuator connected to its respective mounting point by a cable, chain or harness. Each actuator 130 has a fixed mounting point fixed relative to the ground at its lower end and is articulated to the support frame 140 to allow the base of the actuator 130 to pivot relative to the support frame about a horizontal pivot axis 137 which is parallel to the pivot axis 127 between the piston 134 and the load frame 120. In FIG. 2, each piston 134 is shown in a mid-stroke position, i.e. mid way between the fully retracted and fully extended positions. In this position, the load frame 120 is rotationally aligned and no torsional loads are applied to the blade by the load frame 120. The actuators 130 are arranged on either side of the longitudinal axis of the blade and are both positioned beneath the blade so that extension of the piston from the cylinder results in a generally upward vertical force on the load frame. However, it will be appreciated that other arrangements of actuator may be used in order to generate a couple on the load frame. For example, the actuators could be connected to the support frame such that one pushes down on the load frame while the other pushes up on the load frame. Alternatively, one or both of the actuators could be connected to the side of the support frame and arranged to apply a substantially horizontal force to the load frame.

The support frame 140 includes two parallel uprights 141 connected at their upper ends by a crossbeam 142 and connected at their lower ends by a support base 143. The support base 143 includes wheels 144 on its underside by which the support frame 140 may be moved to adjust its position relative to the blade. The support base 143 also includes a plurality of feet 145 on its underside by which the support frame 140 may be supported in a fixed manner. The feet include suction pads on their undersides to allow the support frame to be anchored to a floor surface during use. The wheels 144 are selectively retractable upwards to allow the support frame to rest on the feet 145 once the support frame is in the correct position. The support base can carry additional weights (not shown) to further limit movement of the support frame during use. The uprights 141 each include an actuator mount 146 at which ends of the actuators 130 are fixed relative to the ground, although being pivotally connected to the support frame 140. To provide support for the load frame 120 when the test apparatus is not in use, the support frame 140 also includes a weight block 147 connected to the load frame 120 by a cable 148 and pulleys. The weight block, cable and pulley arrangement acts as a counterweight to bear at least a portion of the weight of the load frame 120. This reduces the load on the actuators 130 caused by the weight of the load frame 120 when the load frame 120 is not mounted on the blade. It also reduces the amount of edgewise loading of the blade due to the weight of the load frame during use. This may improve the accuracy of the results obtained from a torsional test by reducing or minimising blade motion which is caused by edgewise loading. This may ensure that the measurements of blade motion obtained are limited to motion caused by torsional loading only.

To mount the load frame 120 on the blade, the load frame 120, actuators 130 and support frame 140 are moved together to the tip end of the blade and the insert 124 placed over the tip end. The support frame 140 is then moved towards the test stand 110 to slide the load frame 120 along the length of the blade towards the root end until the correct position along the length of the blade is reached at which point the insert fits securely against blade surface.

Once the load frame is secured on the blade, one of the pair of actuators 130 is extended while the other is simultaneously retracted in an opposite manner by actuator drive means (not shown), such as a hydraulic or pneumatic pump or an electrical motor, to apply a couple to the load frame 120 about the longitudinal direction of the blade. This couple is transferred to the blade by the insert to twist the blade about its longitudinal direction and thereby generate a torsional load. Typically, the torsional load generated during the static torsional test is selected to evaluate torsional stiffness of the blade. It may also be selected to represent the ultimate load to which the blade is expected to be subjected during its design service life. The degree to which each actuator is extended or retracted should mirror that of the other actuator to minimise vertical bending loads applied to the blade by the test apparatus. As the torsional loads are applied by a profiled insert and applied across substantially the entire profile of the blade, the torsional stresses and strains generated in the blade by the test apparatus 100 are more representative of actual operating conditions.

Further, by arranging the load frame and the actuators such that the blade is held in an edgewise orientation, that is, with its longitudinal direction substantially horizontal and its edgewise direction substantially vertical, the blade is subjected to less deflection under its own weight. This means that the torsional stiffness of the blade can be assessed with the blade in a state of deflection which is more representative of its actual state during operation, resulting in more accurate test results. Improved knowledge of the torsional stiffness of the blade can also allow design to avoid resonance of the blade, such as flutter, during operation. A more accurate torsional test can also reduce "over engineering" of the blade from seeking to achieve the required performance during less representative tests in which the strains are higher.

In the example shown, the outer frame 122 and the insert 124 are each provided as a single, closed structure. In other examples, one or both of the outer frame 122 and the insert 124 may be provided in two or more discrete elements. This allows the load frame to be assembled around the blade at the testing position by fixing the frame elements together. This avoids the need for sliding along the length of the blade. This may be useful, for example, where other items of testing equipment, such as strain gauges or other load frames, are attached to the blade prior to mounting of the load frame.

Although the above description relates to the use of the test apparatus for performing a static torsional test, it will be appreciated that the test apparatus could be used to perform a fatigue torsional test, if required, by exerting a cyclical loading cycle on the load frame using the actuators.

It will be appreciated that various modifications to the embodiments described above are possible and will occur to those skilled in the art without departing from the scope of the invention which is defined by the following claims.

The invention claimed is:

1. A test apparatus for torsional testing of a wind turbine blade, comprising:
   a test stand for rigidly supporting a root end of the wind turbine blade;
   a load frame for mounting on the wind turbine blade at a testing position along the length of the wind turbine blade; and
   at least one actuator connected between a fixed mounting point and the load frame for twisting the wind turbine blade about its longitudinal axis via the load frame,
   wherein the load frame comprises an outer frame to which the at least one actuator is connected and a profiled insert held within the outer frame, the profiled insert defining a profiled aperture substantially corresponding to the profile of the wind turbine blade at the testing position such that, in use, the profiled insert substantially encloses and is in direct contact with the outer surface of substantially the entire profile of the wind turbine blade.

2. The test apparatus according to claim 1, wherein the profiled insert is formed from a material having a compressive strength of from about 0.3 MPa to about 10 MPa.

3. The test apparatus according to claim 1, wherein the profiled insert comprises a stress reduction hole which intersects with an end of the profiled aperture corresponding to an edge of the wind turbine blade, the stress reduction hole having a radius of curvature which is greater than the radius of curvature of the edge of the wind turbine blade.

4. The test apparatus according to claim 1, wherein the at least one actuator comprises a pair of linear actuators arranged to apply a couple to the outer frame.

5. The test apparatus according to claim 1, further comprising a support frame to which the at least one actuator is mounted, the support frame being adjustably moveable relative to the test stand in the direction of the length of the wind turbine blade.

6. The test apparatus according to claim 5, wherein the support frame comprises a counterweight arranged to bear at least a portion of the weight of the load frame.

7. A system for torsional testing of a wind turbine blade, the system comprising a test apparatus according to claim 1 and a wind turbine blade to be tested, wherein a root end of the wind turbine blade is supported by the test stand of the test apparatus such that the longitudinal axis of the blade is substantially horizontal and the edgewise axis of the blade is substantially vertical.

8. A test apparatus for torsional testing of a wind turbine blade, comprising:
   a test stand for rigidly supporting a root end of the wind turbine blade;
   a load frame for mounting on the wind turbine blade at a testing position that is between the root end and a tip end of the wind turbine blade; and
   at least one actuator connected between a fixed mounting point and the load frame for twisting the wind turbine blade about its longitudinal axis via the load frame,
   wherein the test stand, the load frame, and the at least one actuator are arranged such that, in use, the wind turbine blade to be tested is rigidly supported by the test stand with the longitudinal axis of the blade substantially horizontal and the edgewise axis of the blade substantially vertical.

9. The test apparatus according to claim 8, wherein the at least one actuator comprises a pair of linear actuators arranged to apply a couple to the load frame.

10. A method of torsional testing a wind turbine blade, the method comprising:
    rigidly supporting a root end of the wind turbine blade in a test stand such that the longitudinal direction of the blade is substantially horizontal and the edgewise direction of the blade is substantially vertical;
    mounting a load frame on the wind turbine blade at a testing position that is between the root end and a tip end of the wind turbine blade;
    connecting at least one actuator between a fixed mounting point and the load frame; and
    twisting the wind turbine blade about its longitudinal axis at the testing position using the at least one actuator and the load frame.

11. The method of claim 10, wherein the load frame comprises an outer frame to which the at least one actuator is connected and a profiled insert held within the outer frame, the profiled insert defining a profiled aperture substantially corresponding to the profile of the wind turbine blade at the testing position such that the profiled insert substantially encloses and is in direct contact with the outer surface of substantially the entire profile of the wind turbine blade.

12. The method of claim 10, wherein the step of connecting at least one actuator to the load frame is carried out by connecting a pair of linear actuators to the load frame and the step of twisting the wind turbine blade about its longitudinal axis is carried out by applying a couple with the pair of linear actuators.

13. The method of claim 10, wherein the step of connecting at least one actuator to the load frame comprises providing a support frame to which the at least one actuator is mounted and connecting the load frame to the support frame via the at least one actuator.

14. The method of claim 10, wherein the step of mounting a load frame on the wind turbine blade is carried out by sliding the load frame along the length of the blade from a tip end of the blade to the testing position.

15. The test apparatus according to claim 1, wherein the at least one actuator is arranged to exert a force on the load frame in a substantially vertical direction and is configured to act against a weight of the wind turbine blade.

16. The test apparatus according to claim 4, wherein the pair of linear actuators are configured to be arranged one on each side of the longitudinal axis of the wind turbine blade, at least one linear actuator of the pair of linear actuators being configured to exert a force on the load frame in a substantially vertical direction.

17. The test apparatus according to claim 8, further including a profiled insert held within the load frame, and wherein the profiled insert comprises a stress reduction hole which intersects with an end of the profiled aperture corresponding to an edge of the wind turbine blade, the stress reduction hole having a radius of curvature which is greater than the radius of curvature of the edge of the wind turbine blade.

18. The test apparatus according to claim 8, wherein the at least one actuator is arranged to exert a force on the load frame in a substantially vertical direction and is configured to act against a weight of the wind turbine blade.

19. The test apparatus according to claim 8, the test stand includes a plurality of threaded bolts extending therefrom, the plurality of threaded bolts are configured to screw into a corresponding plurality of threaded bolt holes at the root end of the wind turbine blade.

20. The test apparatus according to claim 8, wherein the at least one actuator comprises a pair of linear actuators configured to be arranged one on each side of the longitudinal axis of the wind turbine blade, at least one linear actuator of the pair of linear actuators being configured to exert a force on the load frame in a substantially vertical direction.

\* \* \* \* \*